United States Patent [19]
Tropp et al.

[11] 3,827,346
[45] Aug. 6, 1974

[54] FOOD-TREATMENT APPARATUS WITH GREASE-COLLECTION HOOD FOR AIR CIRCULATOR

[75] Inventors: Karl Tropp, Werdorf; Wilfried Durth, Burbach-Wahlbach; Henrich Jakob, Burg, all of Germany

[73] Assignee: Berger Eisenwerke Aktiengesellschaft, Herborn, Germany

[22] Filed: June 8, 1973

[21] Appl. No.: 368,117

[30] Foreign Application Priority Data
June 15, 1972  Germany........................... 7222326

[52] U.S. Cl.................. 99/446, 99/447, 99/474, 126/21 A, 219/370, 219/400, 312/236
[51] Int. Cl.............................................. A47j 27/00
[58] Field of Search.......... 219/35.5, 370, 400, 460; 34/215; 98/115 K; 99/375, 444, 446, 447, 474; 126/21 A, 273 R, 274, 275 E, 299 A; 312/236

[56] References Cited
UNITED STATES PATENTS
1,745,340  1/1930  Parker................................. 99/446

| | | | |
|---|---|---|---|
| 2,490,076 | 12/1949 | Maxson........................ | 219/400 X |
| 2,491,420 | 12/1949 | Scott................. | 219/400 |
| 2,862,095 | 11/1958 | Scofield........................ | 219/400 X |
| 2,906,620 | 9/1959 | Jung.............................. | 219/400 X |
| 3,259,120 | 7/1966 | Keating........................... | 126/21 A |
| 3,465,124 | 9/1969 | Sauer.............................. | 219/400 |
| 3,514,577 | 5/1970 | Dills et al......................... | 219/400 |
| 3,587,555 | 6/1971 | Cerola.......................... | 126/21 A X |
| 3,669,090 | 6/1972 | Jung et al. ....................... | 126/21 A |
| 3,692,968 | 9/1972 | Yasuoka........................ | 219/400 X |

*Primary Examiner*—Volodymyr Y. Mayewsky
*Attorney, Agent, or Firm*—Karl F. Ross; Herbert Dubno

[57] ABSTRACT

A foodstuff is placed on a rack in a food-treatment apparatus having a chamber. Air in the chamber is drawn in by a blower positioned adjacent a rear wall and is displaced outwardly along the chamber walls past heaters to again reach the foodstuff. The blower is surrounded by means, e.g. a hood, for protecting the oven from grease or fat spatter, and the bottom of the chamber is provided with a trough for collecting fat dripping from the hood, the racks, baffle plates and other surfaces in the oven.

2 Claims, 7 Drawing Figures

PATENTED AUG 6 1974  3,827,346

FOOD-TREATMENT APPARATUS WITH GREASE-COLLECTION HOOD FOR AIR CIRCULATOR

1. CROSS-REFERENCE TO RELATED APPLICATIONS

This application is related to the commonly assigned applications Ser. No. 247,160 (U.S. Pat. No. 3,780,721) and 343,537 of 24 Apr. 1972 and 21 Mar. 1973.

2. FIELD OF THE INVENTION

Our invention relates to a food-treatment apparatus, especially an oven, used for heat treatment (cooking) of foodstuffs, and in which heated air is circulated in the chamber by a blower and continuously passes over the foodstuff. More particularly the invention relates to such an oven which is easier to clean than conventional or prior-art systems.

3. BACKGROUND OF THE INVENTION

It is known in the art that fat-containing deposits appear on various surfaces of an oven for baking, roasting or otherwise cooking food articles containing fats, e.g., when meat products of different kinds are roasted or pastries are baked therein. Such deposits appear on the walls of the chamber of the apparatus, on racks and baffle plates extending therethrough and especially in the region of the outlet port or ports of the blower. Foodstuff substances, in the form of small particles, and water droplets travel with the circulated hot air. When the concentration thereof in the air grows and the temperature is locally lowered for some reason, the tendency toward separation and deposit-forming of these substances grows. The outlet areas of the circulating means are particularly prone to deposit-formation of foodstuff substances because the circulated air mass has a tendency to cool down when it is ejected from the circulating means. Some deposition of fatty products entrained by the air also results at flow-direction-changing locations and upon impingement of the circulated air upon a solid surface.

Spattering and spouting of foodstuff substances is also a problem in a food-treatment apparatus used for heat treatment of foodstuff. Elements in the apparatus having intricate surfaces, e.g. the air-circulating means, are difficult to clean when they have been subjected to coating by fats, proteins and carbohydrates and, after some time, have been baked or carbonized.

4. OBJECTS OF THE INVENTION

The principal object of the present invention is to keep all surfaces of a food-treatment apparatus of the abovedescribed type as clean as possible and to do so with the least possible effort and expense.

Another object of our invention is to provide means for simplifying the cleaning of an apparatus for heat-treatment of foodstuff, in which hot air is circulated and foodstuff substances deposit and spatter onto various surfaces of the apparatus.

Another object is the provision of a means for protecting the interior surfaces of an oven for the preparation of foods from fat or grease deposits.

5. SUMMARY OF THE INVENTION

We attain these objects by providing the chamber of a food-treatment apparatus with removable means surrounding the air-circulating means or blower and for thereby collecting entrained fat particles around the periphery of the blower. The protecting means is separable from the air-circulating means and also removable from the chamber.

According to a feature of our invention, the protecting means is an annular hood which can be mounted on a support plate and removable secured thereon by fastening means, e.g. wing nuts. The support plate is mounted on flanges of the chamber of the apparatus. A shaft carrying the circulating means, e.g. a blower, is journalled in the support plate. Thus, the support plate and the protecting means enclose the circulating means.

According to another feature of the invention, the protecting means can be provided with a filter means placed in the path of the hot air mass which is circulating through the apparatus, preferably just inwardly of the outlets. Particles of foodstuff and water droplets entrained by the air mass can be removed by the filter means.

The protecting means can be formed as a dish-like cover having a central opening and one or more lateral outlet slots formed in the cylindrical apron of the hood. The circulating means, e.g. a blower, draws the hot air from the chamber of the apparatus through the central opening of the protecting means and ejects the air through the lateral slots so that the air passes heaters and is returned to the food-containing chamber of the apparatus.

According to another feature of our invention, the bottom of the chamber can be provided with a removable fat-collecting reservoir, to collect foodstuff substances and water flowing and dripping from the protecting means and other surfaces of and in the chamber, i.e., the lateral walls and the rack thereof.

The food-treatment apparatus of our invention can also be provided with a gutter outside the chamber but under the door to the chamber, to collect foodstuff substances and water which flow out or drop down when the door is opened or through a slight gap beneath the door.

6. DESCRIPTION OF THE DRAWING

The above and other objects, features and advantages will become more readily apparent from the following description, reference being made to the accompanying drawing in which.

7. SPECIFIC DESCRIPTION

Figure 1:
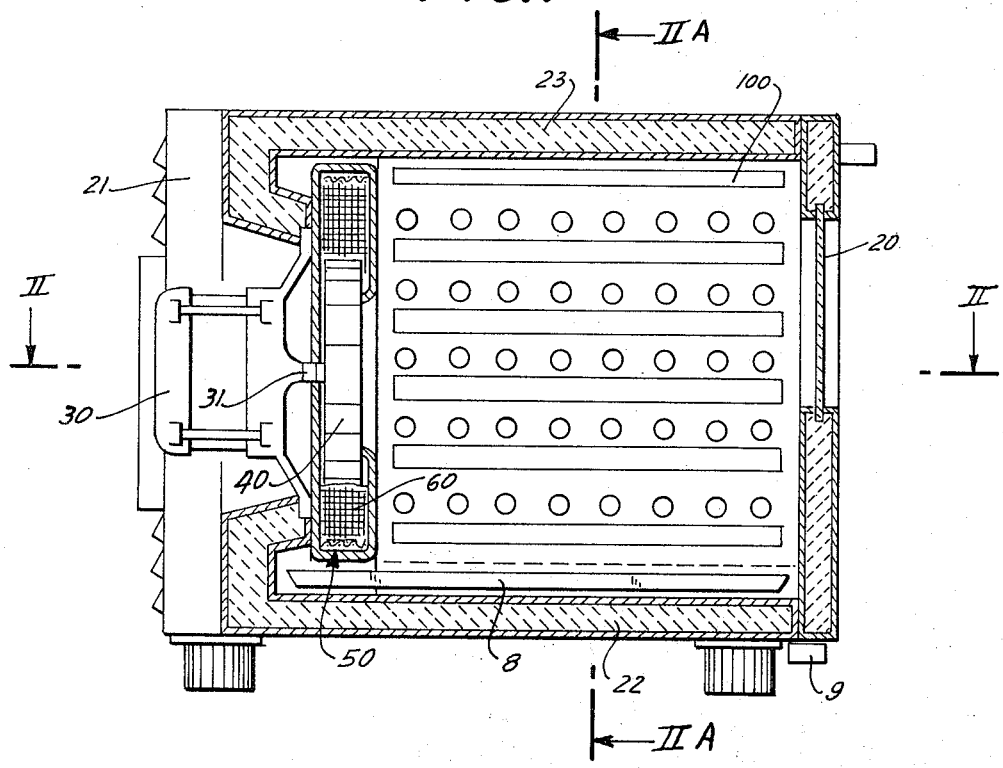
FIG. 1 is an elevated axial partially sectional view of an apparatus according to the present invention.
Figure 2:
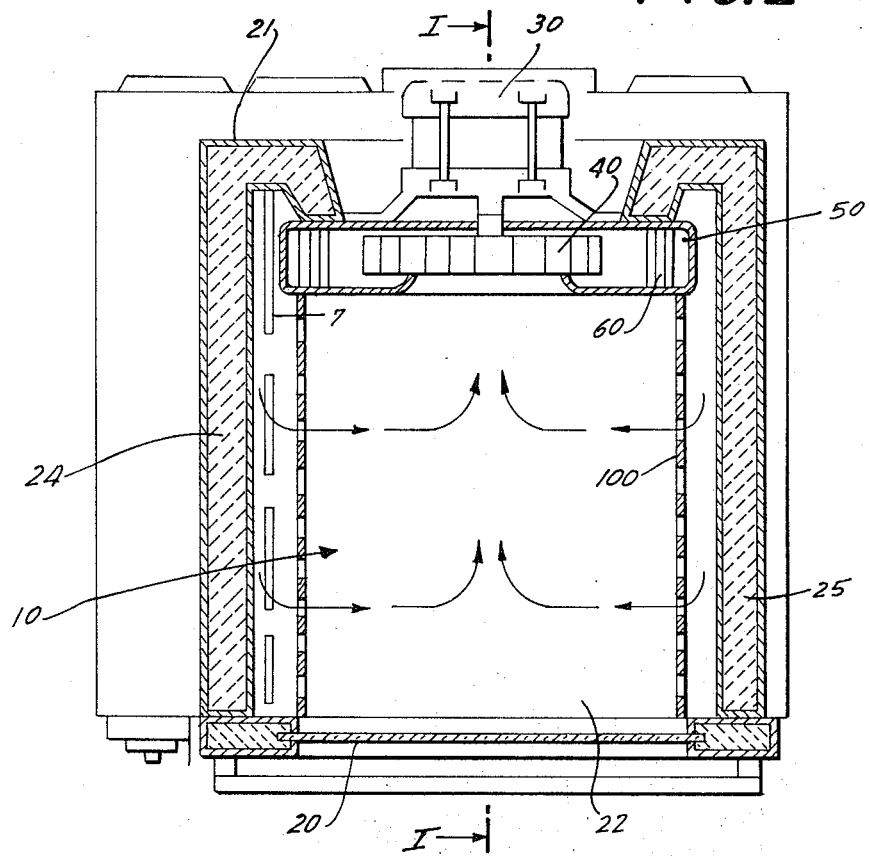
FIG. 2 is a partially sectional top view (along line II—II of FIG. 1) of an apparatus according to this invention.

Referring now to FIGS. 1 and 2, the food-treatment apparatus illustrated therein comprises a rectangular parallelepipedal chamber 10 bounded by a door 20, a rear wall 21, a horizontal top wall 23, two long vertical walls 24 and 25, and a bottom 22.

A motor 30 having a shaft 31 is mounted in rear wall 21 by outwardly turned lugs. A blower 40 adjacent rear wall 21 is driven by shaft 31. Blower 40 is covered by an annular (cylindrical) spatter protection hood 50. Ring-shaped fat filter 60 is mounted on the surface of the hood 50 which faces blower 40 and surrounds the periphery thereof.

Heaters 7 (FIG. 2) are placed along wall 24. A fat collecting reservoir 8 is placed on bottom 22 of chamber 10, and a fat collecting gutter 9 is provided under door 20 but outside chamber 10.

Perforated or slotted baffle plates 100 are arranged along walls 24 and 25 in chamber 8.

Figure 4:
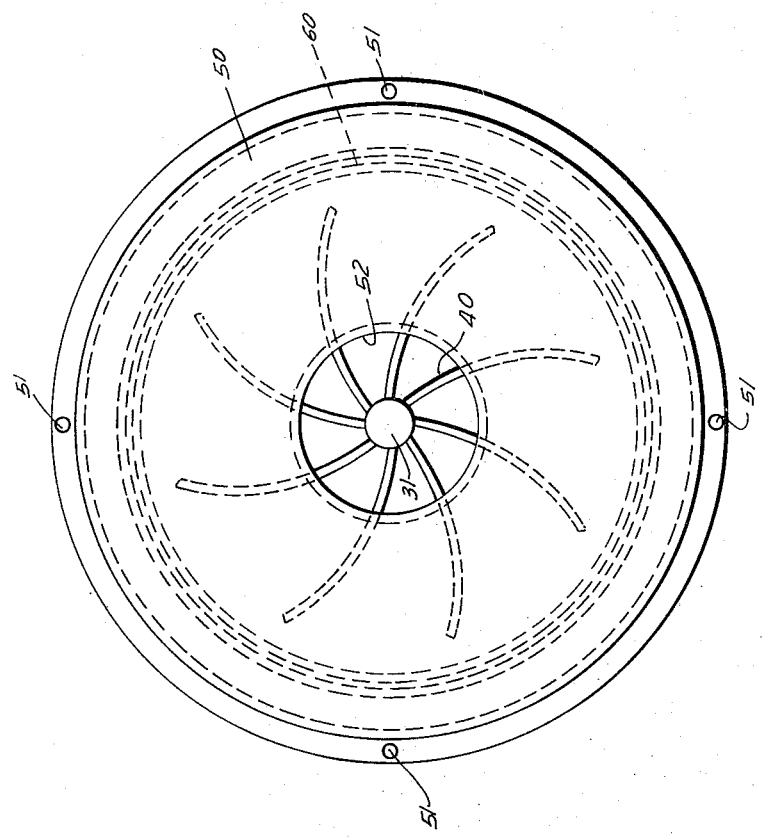
FIG. 4 is an elevational front view of the protecting means of FIG. 3 as seen from the door of the food-treatment apparatus.
Figure 3:
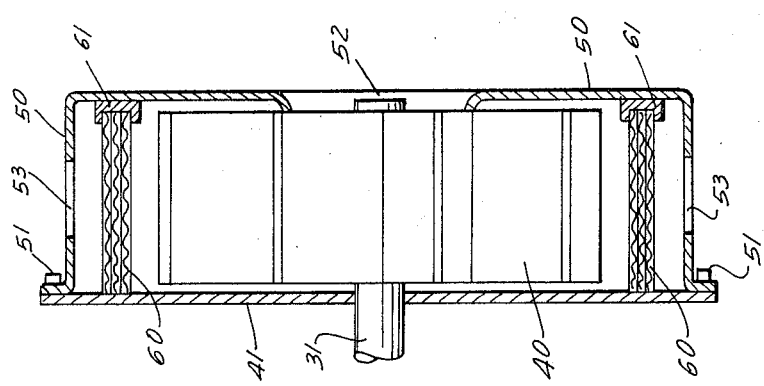
FIG. 3 is a sectional elevational view of one embodiment of the protecting means of this invention covering the circulating means.

In FIGS. 3 and 4, blower 40 is seen to be carried by a shaft 31 of the motor. Shaft 31 is journaled in support plate 41, which is mounted on flanges of chamber 10. Blower 40 is enclosed by support plate 41 and protective hood 50. Hood 50 is removably secured to support plate 41 by four securing elements 51, e.g. wing nuts. Protective hood 50 has a central opening 52 and a series of lateral slots 53.

A ring-shaped filter 60 is removably secured to protecting means 50 on its inner surface facing blower 40. Filter 60 is locked by two concentric ribs 61 on protecting means 50 and abut support plate 41 to secure necessary sealing.

Foodstuffs are placed on racks (not shown) in chamber 10. Door 20 is closed. Resistive heaters 7 are connected to an electrical power source (not shown) and motor 30 is started. The air mass in chamber is drawn through opening 52 of protecting hood 50 by blower 41, is ejected by the same through slots 53 of the hood 50 and passes heaters 7 before it is guided by baffle plates 100 back into chamber 10. Foodstuff is heated thereby. The air is again drawn through opening 52. It is still hot and entrains foodstuff substances and water. When it is ejected toward slots 53 of hood 50 it is cooled and much of the entrained foodstuff substances and the water is collected in ring-shaped filter 60 secured between the hood 50 and the support plate 42.

The heating of the foodstuff causes spattering of foodstuff substances. They are deposited on protecting means 50 as well as on door 20 and walls 24 and 25. They also drip and flow on these surfaces and other surfaces in and out of chamber 10 and are collected in the removable fat collecting reservoir 8. Fat collecting gutter 9 is provided outside chamber 10 under door 20 to collect dripping and flowing foodstuff substances and water on the door when the heat treatment of foodstuff 11 is completed and door 20 is opened.

The pan 8 is shown to have lips reaching below the hood 50 and laterally to the walls 24 and 25 of the food-treatment chamber. The width of this pan is just slightly less than that of the door opening (i.e., the distance between the walls 24 and 25) to enable its removal therethrough. The diameter of hood 50 is likewise less than this distance and the height of the door opening for removal and cleaning.

Figure 5:
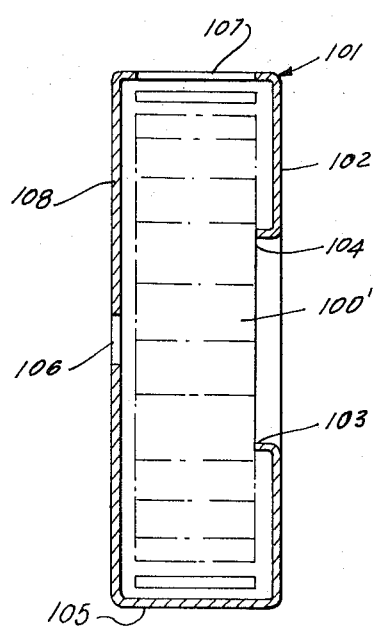
FIG. 5 is an axial section through another hood arrangement embodying the invention.
Figure 6:
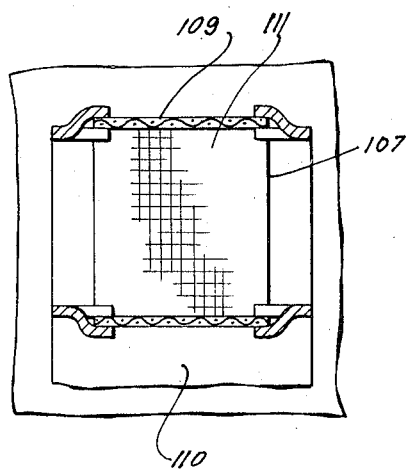
FIG. 6 is a detail view of a slot thereof viewed from the interior.
Figure 2A:
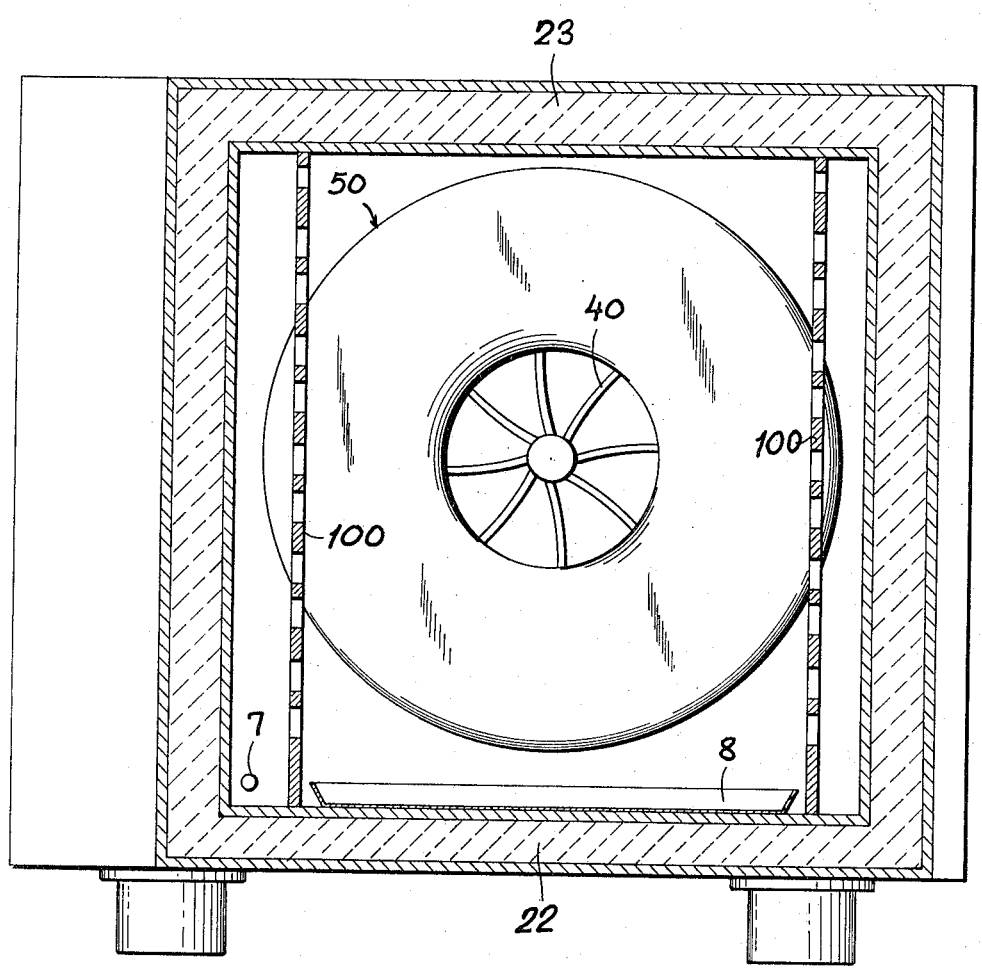
FIG. 2A is a section along line IIA — IIA of FIG. 1.

In FIGS. 5 and 6 we show an embodiment of the hood 101 which encloses the axial-intake radial outflow blower 100' shown in dot-dash lines. The hood, which is removable with the blower rotor and can be separable to afford access thereto. The hood 101 comprises a disk-shaped back plate 108 having a central bore 106 through which the shaft of the blower 100' passes. The disk can be removably attached to the rearwall of the oven by screws or bolts by any conventional manner. The disk 108 is affixed to a cylindrical portion 106 provided with outlet slots 107 flanked by flanges 109, 110 under which a nonwoven metal fiber pad 111 was fitted and from which the pad could be removed for cleaning.

Ahead of the cylindrical portion 108, which is coaxial with the rotor of blower 100' and surrounds it, there is provided an annular apron 102 extending transversely to the rotor axis and defining a central intake opening 104. An inwardly bent annular lip 103 reaches toward the central opening of the blower.

We claim:

1. An apparatus for the heat treatment of foodstuffs, comprising an oven provided with a chamber having a pair of lateral walls, a top wall, a bottom, a rear wall, an opening at an end of said oven opposite said rear wall, and a door for closing said opening; a blower in said chamber mounted on said rear wall and having an axial intake and lateral outlet, said blower being adapted to circulate air through said chamber into contact with foodstuffs therein, said blower being provided with a hood surrounding the blower and formed with an opening aligned with the blower intake and a plurality of outlet apertures spaced around said blower for discharge of air therefrom; electrical heaters in said chambers outwardly of said apertures for heating air passing through said hood; a grease-collecting pan on said bottom of said chamber and removable therefrom through said opening at said end of said oven, said pan underlying said hood and reaching substantially to said lateral walls; an electric motor on said oven for driving said blower and at least one grease-trapping filter disposed within said hood ahead of said apertures for removing grease particles from air circulated through said hood.

2. The apparatus defined in claim 1, further comprising a grease-collecting gutter on said oven externally of said chamber and below said door, said chamber being provided with perforated baffles parallel to but spaced from said lateral walls, said pan reaching beneath said baffles, said hood being removable through said opening at said end of said chamber.

* * * * *